United States Patent [19]

Kranz

[11] Patent Number: 4,579,364
[45] Date of Patent: Apr. 1, 1986

[54] RELEASABLE LOCK MECHANISM FOR HITCH PINS

[76] Inventor: Roy F. Kranz, Rte. 5, Box 61, Pierz, Minn. 56364

[21] Appl. No.: 638,055

[22] Filed: Aug. 6, 1984

[51] Int. Cl.⁴ .............................................. B60D 1/02
[52] U.S. Cl. .................................... 280/507; 280/515
[58] Field of Search .......... 280/515, 511, 507, 478 R, 280/504, 477; 403/317; 172/677

[56] References Cited

U.S. PATENT DOCUMENTS

| | | | |
|---|---|---|---|
| 2,593,247 | 4/1952 | Benteman | 280/515 |
| 2,845,281 | 7/1958 | Holder et al. | 280/478 B |
| 3,081,663 | 3/1963 | Davis | 280/515 X |
| 3,730,558 | 5/1973 | Litzenberger | 280/511 |
| 3,926,456 | 12/1975 | Lundebrek | 280/515 |
| 4,147,374 | 4/1979 | Jeffes | 280/478 R |
| 4,394,031 | 7/1983 | Barton et al. | 280/515 |

*Primary Examiner*—David M. Mitchell
*Assistant Examiner*—Mitchell J. Hill
*Attorney, Agent, or Firm*—Merchant, Gould, Smith, Edell, Welter & Schmidt

[57] ABSTRACT

The present invention relates to a releasable lock mechanism (10) for preventing accidental displacement of a hitch tow pin (24). The tow pin (24) is alternately released and locked in place by pivoting a cam lever (40) 180 degrees which action causes a spring biased member (28) horizontally supported by a support bracket (12) to slide forward over the hitch tow pin (24) and alternately backward away from the hitch tow pin (24) to enable the hitch tow pin (24) to be readily removed.

5 Claims, 6 Drawing Figures

RELEASABLE LOCK MECHANISM FOR HITCH PINS

BACKGROUND OF THE INVENTION

The present invention relates to a releasable lock mechanism for hitch pins. More particularly, the present invention relates to a cam operated releasable lock mechanism for hitch pins which is activated and deactivated by simply pivoting a handle member 180 degrees.

There are many types of lock mechanisms for preventing accidental displacement of a hitch tow pin. For example, U.S. Pat. Nos. 4,394,031; 3,926,456; and 2,845,281 disclose such devices. However, in addition to other differences, none of these devices disclose the use of a cam lever to horizontally slide a retaining member into position so as to overlie a hitch tow pin with a simple 180 degree movement of the cam lever. In addition, the present invention solves many other problems associated with currently existing devices.

SUMMARY OF THE INVENTION

The present invention relates to a releasable lock mechanism which is attachable to a tow bar or other suitable structure of a first vehicle for retaining in place a conventional hitch tow pin inserted through aligned bores in the tow bar proximate a front end thereof and a structure attached to a second vehicle. The releasable lock mechanism includes a support bracket attached to the tow bar and having first and second spaced apart vertically extending members with horizontally aligned apertures therein. The first vertically extending member is closer to the front end of the tow bar and the hitch tow pin than the second vertically extending member. The releasable lock mechanism further includes an elongated cylindrical member slidably supported by the support bracket in the apertures, the elongated cylindrical member having a back end and a front end. The elongated cylindrical member is biased toward the front end of the tow bar by a coil spring positioned around the elongated member, the coil spring being disposed intermediate of the second vertically extending member of the support bracket and a projection positioned on the cylindrical member at a location in back of the first vertically extending member of the support bracket. The elongated cylindrical member is slidable forwardly to a first position wherein the elongated cylindrical member is positioned over the hitch tow pin and is slidable backwardly to a second position wherein the elongated cylindrical member is positioned away from the hitch tow pin so as to enable removal of the tow pin. The releaseable lock mechanism further includes a cam lever pivotally connected proximate the back end of the elongated cylindrical member in back of the second vertically extending member of the support bracket, the cam lever having cam surfaces. The cam lever is pivotal 180 degrees between a retention state and a released state to cause movement of the elongated cylindrical member between the first and second positions, the cam surfaces cooperating with the second vertically extending member of the support bracket to retain the elongated cylindrical member in the first position over the hitch tow pin when in the retention state and to retain the elongated cylindrical member in the second position enabling removal of the hitch tow pin when in the released state.

The present invention is easy to use and can be readily attached to the hitch assemblies of vehicles as required. Furthermore, the present invention does not require any additional parts such as cotter pins or the like to lock the mechanism in the retention or released state. With one simple movement, namely a 180 degree pivotal motion, the locking mechanism is transferred from the retention state to the released state and vice versa. Furthermore, once in position, the cam lever extends substantially horizontally of the tow bar so as to have a relatively low vertical profile and thus not interfere with any working machinery parts.

Further, the present invention provides maximum holding effect and is relatively inexpensive and easy to use.

These and various other advantages and features of novelty which characterize the invention are pointed out with particularity in the claims annexed hereto and forming a part hereof. However, for a better understanding of the invention, its advantages and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
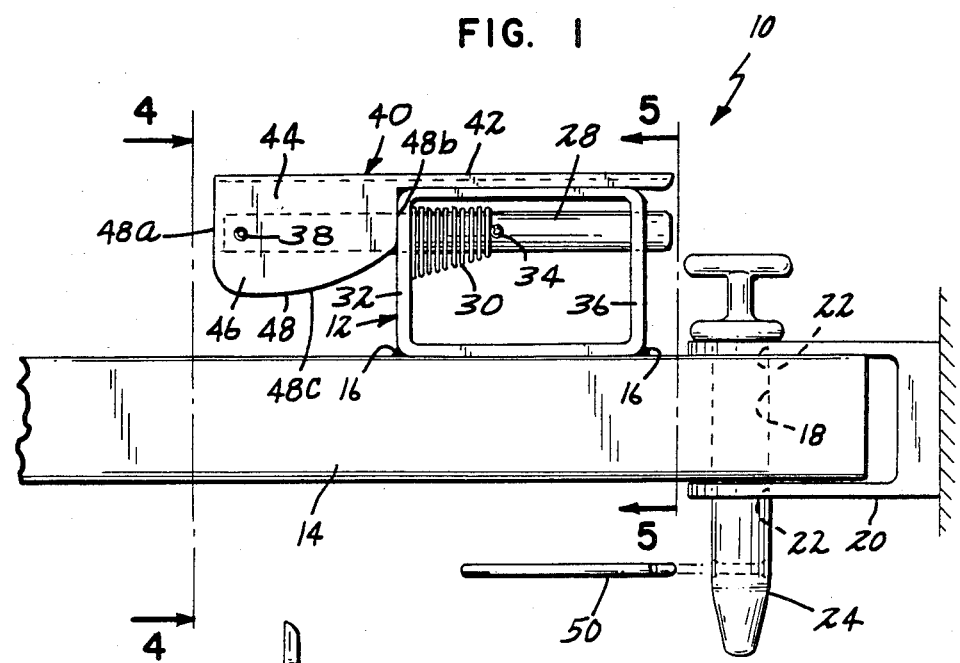
FIG. 1 is a side elevational view showing an embodiment of the present invention positioned on the tow bar of a vehicle while in the released state.
Figure 2:
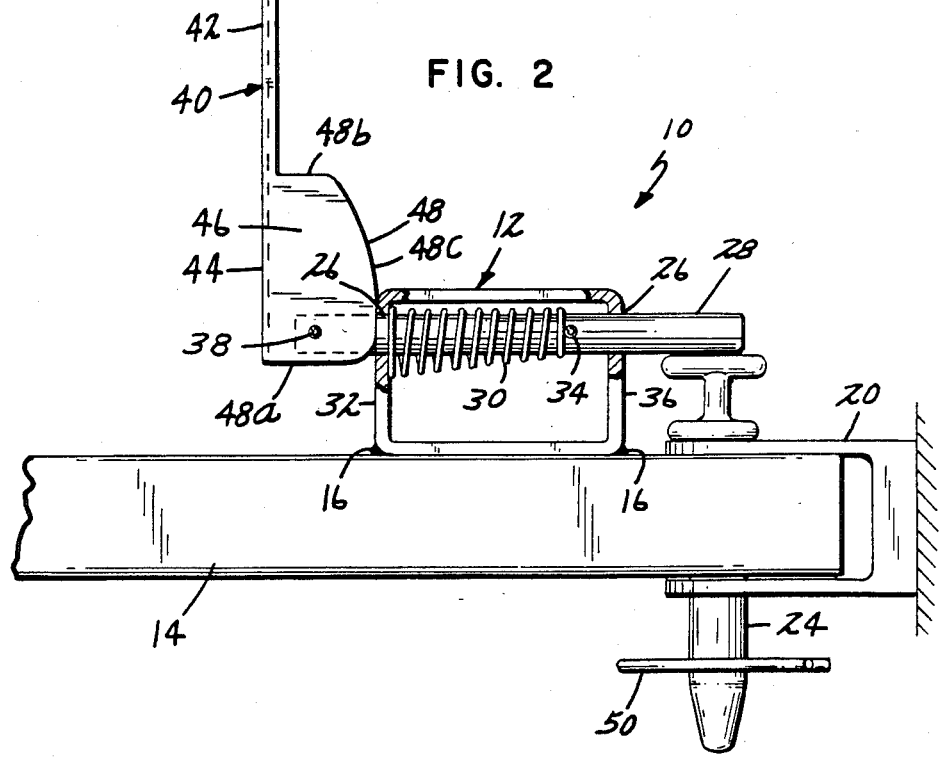
FIG. 2 is a view similar to FIG. 1 illustrating the embodiment in an intermediate state.
Figure 3:
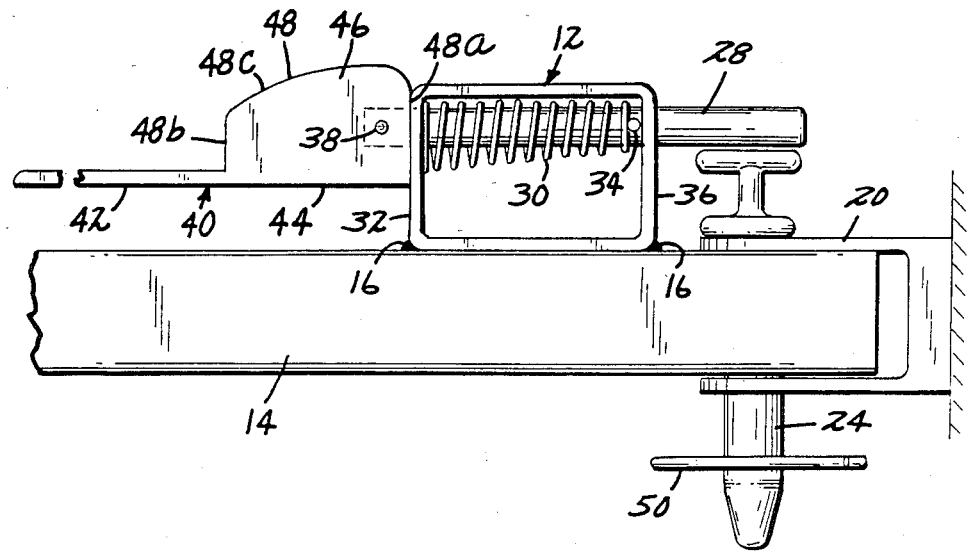
FIG. 3 is a view similar to FIG. 1 showing the embodiment in the retention state.

With reference now to the FIGS. 1-5, and in particular FIGS. 1-3, an embodiment of a releasable lock mechanism, generally designated by the reference numeral 10, in accordance with the principles of the present invention is illustrated in three different operative positions. The releasable lock mechanism 10 includes a metal rectangular bracket 12 suitably mounted on the top surface of a tow bar 14 preferably by welding, as generally illustrated at 16. The tow bar 14 of the vehicle being towed includes an aperture 18 at a front end and is positioned in a clevis 20 of a towing vehicle having aligned apertures 22, such that the apertures 18 and 22 are aligned to enable a hitch tow pin 24 to be inserted therethrough. It will be appreciated that the hitch assembly might have other configurations; for example, the tow bar 14 might have a clevis configuration at its front end for pivotal attachment to a draw bar structure of a tractor or the like. In addition, the releasable lock mechanism 10 might be positioned on the towing vehicle such as the draw bar of a tractor.

Figure 4:
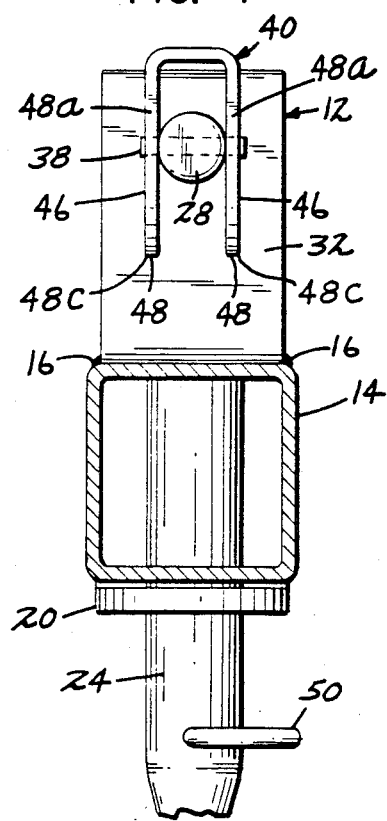
FIG. 4 is a view as seen generally along line 4—4 of FIG. 1.
Figure 5:
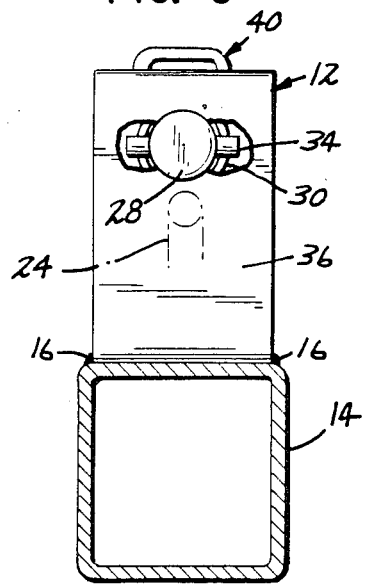
FIG. 5 is a view with parts broken away as seen generally along line 5—5 of FIG. 1.

The bracket 12 has horizontally aligned apertures 26 to slidably support an elongated, horizontally extending cylindrical member 28. The cylindrical member 28 is spring biased by a coil spring 30 positioned about the cylindrical member 28 between a vertically extending back end member 32 of the bracket 12 and a transversely extending pin 34 positioned on the cylindrical member 28 between the vertically extending back end member 32 and a vertically extending front end member 36 of the support bracket 12. Pivotally interconnected by a pivot pin 38 proximate the back end of the cylindrical member 28 is a cam lever 40. The cam lever 40 includes a relatively flat elongated handle portion 42 connected to a U-shaped cam portion 44 as generally illustrated in FIG. 4 having two spaced apart parallel side walls 46. The pivot pin 38 extends between the walls 46 through the cylindrical member 28, a portion of which is positioned between the side walls 46. The side walls 46 define parallel cam surfaces 48 along their free edges. The cam surfaces 48 each define spaced apart, substantially straight surfaces 48a, 48b at first and second ends of the walls 46, the surfaces 48a, 48b being interconnected by a curvilinear surface 48c. The curvilinear surface 48c has a varying radius of curvature as generally illustrated in FIGS. 1-3. The radius of curvature is greater proximate the first end than the second end.

The FIGS. 1-3 illustrate the preferred embodiment of the present invention and three different states of operation, a released state, an intermediate state, and a retention state respectively. In the released state as illustrated in FIG. 1, the cam surfaces 48b which are further removed from the pivot pin 38 than the cam surfaces 48a, are engaging the vertically extending back end member 32 of the support bracket 12 so as to overcome the biasing affect of the coil spring 30 and force the cylindrical member 28 toward the back end of the tow bar 14 such that the cylindrical member 28 is not positioned over the hitch tow pin 24 whereby the hitch tow pin 24 may be readily removed. The coil spring 30 at this time is compressed to its greatest extent. To lock or retain the tow pin 24 in position, the operator grabs the handle 42 and pivots the cam lever 40 backwards into the intermediate position as generally illustrated in FIG. 2. As a result, the cam curvilinear surfaces 48c engage the vertically extending back end member 32 of the support bracket 12 enabling the coil spring 30 to force the cylindrical member 28 forward into a position over the hitch tow pin 24. The operator continues the backward movement of the cam lever 40 until the releasable locking mechanism 10 is in the retention state as generally shown in FIG. 3. In the retention state, the cam surfaces 48a which are closest to the pivot pin 38 are engaging the vertically extending back end member 32 of the support bracket 12 thereby enabling the coil spring 30 to force the cylindrical member even further forward over the tow pin 24. In both the retension and released positions, the substantially straight cam surfaces 48a and 48b respectively are substantially parallel to the vertically extending back end member 32 of the support bracket 12. Accordingly, force must be exerted to pivot the cam lever 40 and overcome the biasing force of the coil spring 30 in order to move the releasable locking mechanism 10 out of either of these two positions. As illustrated, the surfaces 48a have a greater extent than the surfaces 48b. Further, the function between the surfaces 48c and 48a has a lesser radius of curvature or greater curvature than the surfaces 48c. The releasable lock mechanism 10 is effectively releasably locked in each of the retention and released positions such that it does not accidentally become dislodged. The present invention does not require the use of any additional parts such as cotter pins, which the operator must keep track of and can readily lose, to lock the releasable lock mechanism in either the retention or the released state. (As illustrated in FIGS. 1-3, a cotter pin 50 might also be used as a safety back-up for retaining the tow pin 24 in position, although this is not required.)

When in the retention state and the released state, the releasable locking mechanism of the present invention has a low profile as the cam lever 40 extends horizontally. Additionally, the present invention provides for quick and easy reliable operation while requiring few working parts and being relatively inexpensive to make. Further, the present invention may be readily attached via welding or the like to hitches as required.

Figure 6:
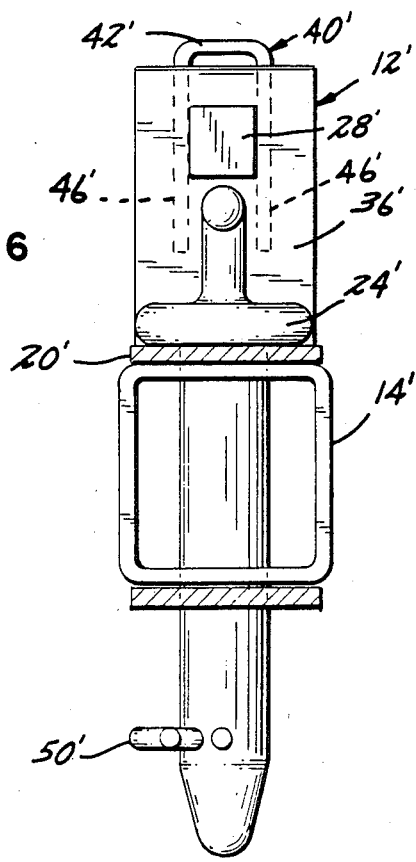
FIG. 6 is a view similar to FIG. 5 of an aternate embodiment.

Illustrated in FIG. 6 is an alternate embodiment of the present invention wherein the cylindrical member 28 is replaced by a member 28' having a square or rectangular cross-section. The square member 28' provides more surface area for the tow pin 24 to engage.

Even though numerous characteristics and advantages of the invention have been set forth in the foregoing description, together with details of the structure and function of the invention, the disclosure is illustrative only, and changes may be made in detail, especially in matters of shape, size and arrangement of parts, within the principles of the invention, to the full extent indicated by the broad general meaning of the terms in which the appended claims are expressed.

What is claimed is:

1. A releasable lock mechanism which is attachable to a tow bar or the like, having back and front ends, of a first vehicle for retaining in place a conventional hitch tow pin inserted through aligned bores in the front end of said tow bar and a structure attached to a second vehicle; the releasable lock mechanism including:

(a) a support bracket having first and second spaced apart, vertically extending members with horizontally aligned apertures therein, said first vertically extending member being closer to the front end of said tow bar and the hitch tow pin than said second vertically extending member;

(b) an elongated member slidably supported by said support bracket in said apertures, said elongated member having a back end and a front end, said elongated member being slidable forwardly to a first position wherein the front end of said elongated member is positioned over said hitch tow pin and slidable backwardly to a second position wherein the front end of said elongated member is positioned away from the hitch tow pin to enable ready removal thereof, said elongated member being biased toward the front end of the tow bar by a coil spring positioned around said elongated member, said coil spring being disposed intermediate of said second vertically extending member of said support bracket, and a projection positioned on said elongated member in back of said first vertically extending member of said support bracket; and (c) a cam lever pivotally connected proximate said back end of said elongated member in back of said second vertically extending member of said support bracket, said cam lever being pivotal 180 degrees between a retention state and a released state, said cam lever includes two spaced apart walls defining parallel cam surfaces, each of said cam surfaces defining first and second spaced apart substantially straight cam surfaces which are interconnected by a curvilinear surface, said substantially straight cam surfaces being parallel to said second vertically extending member of said support bracket when in said retention and released states, the curvilinear cam surface of each of the side walls cooperating with said second vertically extending member to cause movement of said elongated member between the first position and the second position, said substantially straight cam surfaces cooperating with said second vertically extending member of said support bracket to retain said elongated member over the hitch tow pin when in said retention state and to retain said elongated member in the second position to enable the hitch tow pin to be readily removed when in said released state, said cam lever defining a handle portion extending parallel to the elongated member when in said released and retention states.

2. A releasable locking mechanism in accordance with claim 1, wherein said support bracket has a rectangular configuration with horizontally extending top and bottom members which interconnect said first and second vertically extending members.

3. A releasable lock mechanism is accordance with claim 1, wherein said elongated member has a rectangular cross-section.

4. A releasable lock mechanism in accordance with claim 1, wherein said elongated member is an elongated, cylindrical member.

5. A releasable lock mechanism which is attachable to a tow bar or the like, having back and front ends, of a first vehicle for retaining in place a conventional hitch tow pin inserted through aligned bores in the front end of the tow bar and a structure attached to a second vehicle, the releasable lock mechanism including:

(a) a rectangular support bracket having horizontally extending top and bottom members which interconnect first and second spaced apart parallel vertically extending members with horizontally aligned apertures therein, the first vertically extending member being closer to the front end of the tow bar and the hitch tow pin than the second vertically extending member, the bottom member being secured to the tow bar;

(b) an elongated member slidably supported by the support bracket in the apertures, the elongated member having a back end and a front end, the elongated member being forwardly slidable to a first position wherein the front end of the elongated member is positioned over the hitch tow pin and slidable backwardly to a second position wherein the front end of the elongated member is positioned away from the hitch tow pin to enable ready removal thereof, the elongated member being biased toward the front end of the tow bar by a coil spring positioned around the elongated member, the coil spring being disposed intermediate of the second vertically extending member of the support bracket and a projection positioned transversely of the elongated member at a location in back of the first vertically extending member of the support bracket; and (c) a cam lever pivotally connected to the elongated member by a pivot pin member proximate the back end of the elongated member in back of the second vertically extending member of the support bracket, the cam lever being pivotal 180 degrees between a retention state and a released state to cause movement of the elongated member between the first position and the second position, the cam lever having a flat elongated handle portion interconnected to a U-shaped cam portion having two spaced apart, parallel side walls, the pivot pin member extending between the side walls transversely of the elongated member, the side walls having free edges defining substantially identical cam surfaces, the cam surface of each side wall defining two spaced apart substantially straight first and second end cam surfaces extending transversely of the handle portion and interconnected by a curvilinear cam surface, the curvilinear cam surface of each of the side walls cooperating with the second vertically extending member of the support bracket to cause movement of the elongated member between the first and second positions as the cam lever is pivoted, the first end cam surfaces of the side walls cooperating with the second vertically extending member of the support bracket to retain the elongated member over the hitch tow pin when in the retention state, the second end cam surfaces cooperating with the second vertically extending member of the support bracket to retain the elongated member in the second position away from the hitch tow pin when in the released state, the handle portion of the cam lever being longitudinally aligned with and horizontal to the elongated member when in the released and retention states, the first end cam surfaces of the side walls being parallel to and juxtaposed against the second vertically extending member of the support bracket when in the retention state, the second end cam surfaces being parallel to and juxtaposed against the second vertically extending member of the support bracket when in the released state, the second end cam surfaces being further removed from the pivot pin member than the first end cam surfaces.

* * * * *